(12) United States Patent
Rao et al.

(10) Patent No.: US 7,142,994 B2
(45) Date of Patent: *Nov. 28, 2006

(54) ENERGY EFFICIENT DATA ACQUISITION SYSTEM AND A COMPUTER CONTROLLED ON-LINE ENERGY MONITORING SYSTEM INCORPORATING THE SAME

(75) Inventors: Rekapalli Krishnamohan Rao, Chandigarh (IN); Chenthamarai Selvam, Chandigarh (IN); Meenalocahani Chander, Jammu (IN); D. Krishna Moorthy, Chandigarh (IN); Gurusamy Sivanpackiam Ayyappan, Chandigarh (IN)

(73) Assignee: Council of Scientific and Industrial Research, New Delhi (IN)

( * ) Notice: Subject to any disclaimer, the term of this patent is extended or adjusted under 35 U.S.C. 154(b) by 323 days.

This patent is subject to a terminal disclaimer.

(21) Appl. No.: 10/386,157

(22) Filed: Mar. 10, 2003

(65) Prior Publication Data

US 2004/0119608 A1    Jun. 24, 2004

(30) Foreign Application Priority Data

Dec. 19, 2002    (WO) .................. PCT/IB02/05514

(51) Int. Cl.
*G06F 19/00* (2006.01)
(52) U.S. Cl. ...................... 702/62; 361/139
(58) Field of Classification Search .............. 702/62, 702/57–59, 64–65, 118, 182–185, 188; 324/500, 324/512; 361/139
See application file for complete search history.

(56) References Cited

U.S. PATENT DOCUMENTS 4,568,934 A * 2/1986 Allgood ................. 340/870.02
5,627,759 A * 5/1997 Bearden et al. ............... 702/62

* cited by examiner

*Primary Examiner*—Edward Raymond
(74) *Attorney, Agent, or Firm*—Ladas and Parry LLP (57) ABSTRACT

The present invention provides a low cost energy monitoring and accounting system for conservation and management of both electrical and mechanical energy. The energy balance established by the energy monitoring system clearly brings out the losses and wastes as well as abnormalities in energy consumption at different sections of the industry paving the way for effective energy management.

5 Claims, 10 Drawing Sheets

Energy Monitoring system

Fig.1 Energy Monitoring system

Fig.2. The Data Acquisition system for Electrical Energy Measurements

Fig.3. The Data Acquisition system for Physical parameter Measurements

Fig : 4 System Flow Chart

Fig.5: Flowchart of operations of Data Acquisition System for monitoring electrical energy consumptions Fig.6: Flowchart of operations of Data Acquisition System for Monitoring physical parameters

| Aug/09/2002 | CONCISE DAILY REPORT | | | | Date: 08/08/2002 | |
|---|---|---|---|---|---|---|
| | | PRODUCTION | DAILY CONSUMPTION | | SPECIFIC CONSUMPTION | |
| Sl No. | Plant | Unit | Output | Steam | Power | Steam | Power |
| 1 | PO FLOW | Tons | 22.92 | 24.64 | 2,738.04 | 1.07 | 119.44 |
| 2 | PG FLOW | Tons | 6.74 | 12.43 | 1,075.28 | 1.84 | 159.43 |
| 3 | POLYOL | Tons | | | 1,412.09 | | |
| 4 | DEAERATOR | Tons | | 36.00 | | | |
| 5 | AIR GENERATION | Nm3 | | | 6,635.14 | | |
| 6 | STEAM & FUEL OIL | Tons | | 21.00 | | | |
| | SPEC. PER TON OF PO | | | | | | |
| 7 | MILK OF LIME | | | 6.13 | 786.67 | 0.27 | 34.32 |
| 8 | FUEL OIL | | | | | 0.92 | |
| 9 | BOILER | | | | 1,418.34 | | 61.87 |
| 10 | REFRIGRATION | | | | 2,714.81 | | 118.42 |
| 11 | C.T. PUMPS | | | | 4,235.95 | | 184.73 |
| 12 | C.T. FAN | | | | 1,030.28 | | 44.94 |
| 13 | RAW WATER & WPT | | | | 1,281.37 | | 55.89 |
| 14 | CONTROL ROOM/AC SYSTEM | | | | 641.91 | | 28.00 |
| 15 | WWTP | | | | 3,450.36 | | 150.51 |
| 16 | TANK FARM | | | | 198.00 | | 8.64 |
| 17 | HYDRO CARBON | | | | 431.60 | | 18.83 |
| 18 | NPB LOAD | | | | | | |
| 19 | LIGHTING | | | | 19.85 | | 0.87 |
| 20 | OVER ALL (MONITERED) | | | 79.20 | 28,069.69 | | 985.92 |
| 21 | INCOMMING POWER | | | | | | |
| | N2 GENERATION | NM3 | | | | | |
| | AIR TO NITROGEN | | | | | | |
| | N2 PER TON OF PO | NM3 | | | | | |

| Plants | Design Specific Steam | Design Specific Power |
|---|---|---|
| PO | 3.43 | 88 |
| PG | 3.22 | 80 |
| Polyol | 1.23 | 106 |
| Air Generation | | 0.15 |

Fig. 7 (a)

08/08/2002 POWER CONSUMPTION COMPARISON REPORT

| SIL NO. | MAJOR VARIABLE LOADS | CAPACITY (KW) | CONSUMPTION | | B-A | PLANT STATUS ON | |
|---|---|---|---|---|---|---|---|
| | | | 08/07/2002 | 08/08/2002 | | 08/07/2002 | 08/08/2002 |
| 1 | PO PLANT LOAD | | 3,223.76 | 2,730.04 | -485.72 | PO : ON | PO : ON |
| 2 | PG PLANT LOAD | | 1,087.12 | 1,075.28 | -11.84 | PG : ON | PG : ON |
| 3 | POLYOL PLANT LOAD | | 1,780.17 | 1,412.09 | -368.88 | PLOYOL | PLOYOL |
| 4 | SCREW COMPRESSOR-A | 280.00 | | 2.32 | -2.32 | TRAIN 1: | TRAIN 1: |
| 5 | SCREW COMPRESSOR-B | 288.00 | 1,082.63 | 1,157.12 | -74.49 | TRAIN 2: | TRAIN 2: |
| 6 | PO REF COMPRESSOR-A | 55.00 | 637.99 | 598.48 | -39.59 | | |
| 7 | PO REF COMPRESSOR-B | 160.00 | 135.90 | 87.35 | -48.55 | | |
| 8 | IAC-A | 160.00 | 2,988.49 | 2,967.37 | -21.12 | | |
| 9 | IAC-B | 160.00 | 2,881.78 | 2,834.88 | -46.98 | | |
| 10 | IAC-C | 160.00 | | | | | |
| 11 | IAC-D | 160.00 | | | | | |
| 12 | EMERGENCY AIR COMP | 75.00 | 85.36 | | -85.36 | | |
| 13 | CWC PUMP-A | 55.00 | | 0.67 | 0.67 | | |
| 14 | CWC PUMP-B | 132.00 | 0.80 | 1,897.87 | 1,897.06 | | |
| 15 | CWC PUMP-C | 132.00 | 2,334.24 | 353.95 | -1,980.29 | | |
| 16 | CWC PUMP-D | 132.00 | 2,267.31 | 1,983.46 | -283.85 | | |
| 17 | VACUUM PUMP-A | | | | | | |
| 18 | VACUUM PUMP-B | 90.00 | 1,803.23 | 1,822.92 | 18.79 | | |
| 19 | SEND OUT PUMP-A | 45.00 | 415.29 | 396.32 | -18.97 | | |
| 20 | SEND OUT PUMP-B | 45.00 | 2.58 | 55.71 | 53.13 | | |
| 21 | SEC.CHILLED WATER PUP | 22.00 | 167.77 | 194.58 | 26.81 | | |
| 22 | BFW PUMP-A | 30.00 | 469.89 | 484.19 | 14.39 | | |
| 23 | BFW PUMP-B | 30.00 | | 55.33 | 55.33 | | |
| 24 | BFW PUMP-C | 30.00 | | 0.31 | 0.31 | | |
| 25 | FD FAN-A1 | 30.00 | 456.85 | 469.89 | 4.04 | | |
| 26 | FD FAN-A2 | 30.00 | 338.41 | 341.32 | 2.91 | | |
| 27 | FD FAN-B1 | 30.00 | | | | | |
| 28 | FD FAN-B2 | 30.00 | | | | | |
| 29 | COOLING TOWER FAN-A | 30.00 | | | | | |
| 30 | COOLING TOWER FAN-B | 30.00 | 557.78 | 452.25 | -105.53 | | |
| 31 | COOLING TOWER FAN-C | 30.00 | 591.21 | 578.03 | -13.18 | | |
| 32 | HOT GW PUMP-A | 22.00 | | | | | |
| 33 | HOT GW PUMP-B | 22.00 | 389.19 | 398.03 | 8.85 | | |
| 34 | HOT GW PUMP-C | 22.00 | | 1.20 | 1.20 | | |
| 35 | GOLD GW PUMP-A | 30.00 | 456.51 | 464.55 | 8.04 | | |
| 36 | GOLD GW PUMP-B | 30.00 | | | | | |
| 37 | GOLD GW PUMP-C | 30.00 | | 1.33 | 1.33 | | |

Fig. 7 (b)

Fig:8. Block diagram of eLAN energy management networks

FIG. 9 Block Diagram of Energy Monitoring Network

Report Obtained from the Energy Monitoring Program for Industry (EMPOIN)

Company or plant name : AAA Company LTD
Site : Singapore
Industry Sector : Beverage
Types of Main Products : 6
Types of Main Energy : 3

Data No. 10          Data Date : 13/8/1986, Wed

| P. No | Product Name | Net Output | Unit | Value Unit | Value Sum ($) | Equiv. Factor | Equivalent Output |
|---|---|---|---|---|---|---|---|
| 1 | Bottle | 12756.00 | Cases | 12.50 | 159450.00 | 4.70 | 59953.20 |
| 2 | Can | 27141.80 | Litre | 1.50 | 40.712.70 | 1.00 | 27141.80 |
| 3 | Pet | 4396.00 | CTNS | 18.00 | 79128.00 | 5.50 | 24178.00 |
| 4 | Handy | 0.00 | CTNS | 20.20 | 0.00 | 4.60 | 0.00 |
| 5 | Conc | 1034.00 | CNSTS | 11.80 | 12201.20 | 4.80 | 4963.20 |
| 6 | Juice | 0.00 | CTNS | 18.90 | 0.00 | 6.00 | 0.00 |

Total Production Value:             291491.90 ($)

Total Equivalent Production Output:       116236.200 (Litre)

| E. No | Energy Name | Net Consump | Unit | Cost Unit | Cost Sum ($) | Actual Sec | Standard Sec | (A/S)/S |
|---|---|---|---|---|---|---|---|---|
| 1 | Electricity | 22000.00 | KWH | 0.12 | 2640.00 | 0.189 | 0.131 | 44.49 |
| 2 | Fuel | 1391.00 | Litre | 0.50 | 695.50 | 0.012 | 0.009 | 11.91 |
| 3 | Water | 759.00 | K-LTR | 1.95 | 1480.05 | 0.007 | 0.003 | 113.55 |

Total Cost of Energy:             4815.55 ($)

Overall ECF:             0.0165

* SEC : Specific Energy Consumption = Energy Consumption/Production Output.
* (A-S)/S  Deviation of Actual SEC from Standard SEC, Normally Minus Is Better.
* ECF  Energy Cost Factor - Energy Cost/Production Value.

Suggestion  (A-S)/S of Energy Item No. 1 Is too Big. The Related Equipment and Processes Should Be Further Investigated Suggestion  (A-5)/S of Energy Item No. 2 Is too Big. The Related Equipment and Processes Should Be Further Investigated Suggestion  (A-S)/S of Energy Item No. 3 Is too Big. The Related Equipment and Processes Should Be Further Investigated

ENERGY EFFICIENT DATA ACQUISITION SYSTEM AND A COMPUTER CONTROLLED ON-LINE ENERGY MONITORING SYSTEM INCORPORATING THE SAME

TECHNICAL FIELD

The present invention relates to an energy efficient data acquisition system useful for incorporation in a computer controlled On-line Energy Monitoring System and the computer controlled On-line Energy Monitoring System incorporating the data acquisition system for conservation and management of Electrical and Mechanical energy.

BACKGROUND ART

Conservation and management of energy are very essential to our country especially in the industrial sector because of huge amount and high quality energy used in this sector. Further, the cost of energy can be significant in relation to over all production costs.

Energy use is treated not as a necessary overhead, but as a variable cost which can be controlled in the same way that labour and materials are. Therefore, appropriate conservation and good energy management is the cheapest, safest, fastest and most economical way of "producing" energy. The basic tool needed to control industrial energy costs and the management of the energy is a on-line energy monitoring system which provides vital information on energy usage, pattern of energy usage and specific energy consumption in an industry. The present invention is directed towards achieving the above said needs.

A Paper titled "Energy Conservation through Management" by Michael R. Boddington in Productivity, Vol.32, No.4, January–March 1992, 617–624 describes a management approach for saving energy through the systematic approach of monitoring and target setting (M&T). M&T is a management information and cost control system which is the key to reducing energy consumption and cost. This systematic approach will enable industries to reduce the energy consumption, control costs with minimum of resources and efforts and increase profits.

The paper describes the basis of M&T System and how to set it up in a manufacturing organization. It describes clearly how to set up account centers, making people responsible, collecting and analyzing the data and computerizing. The following steps are required in setting up an M&T system:
1. The Audit
2. Selecting the Energy Account Centres (EACs)
3. Deciding on metering requirements
4. Formulating an effective management structure
5. Setting-up a data collection system
6. Setting standards
7. Setting targets
8. Reporting The Audit: Before setting up an M&T system an energy audit and site survey is recommended with the following aims:
 To obtain information on energy consumption and energy costs over the preceding 1 or 2 years broken down according to the energy source.
 To estimate how much energy is used in different applications, i.e., process, space heating/air conditioning.
 To identify the opportunities for energy saving and the measures which could be taken to improve energy efficiency.
 To estimate the cost of implementing these measures and the potential savings.

Energy Account Centres (EACs): The number and locatins of EACs will depend on the annual energy consumption and the nature of manufacturing processes. At a small factory the energy consumption of the whole site may be monitored through a single EAC. At larger sites EACs will correspond with the main stages of areas of production so that the management is made directly accountable for the efficient use of energy. In deciding on the location of an EAC it is necessary to consider the following:
 Whether the estimated energy consumption and the potential cost savings would justify the cost of metering and the effort involved in metering.
 Whether energy used can be satisfactorily related to throughput and that practical standards can be set.

Metering: In order to first draw a layout of the site, noting existing meter positions in relation to the proposed EACs. It will then become apparent where additional meters need to be installed.

Management Structure: It is important to get the management structure right, a typical energy management team for a manufacturing organization would be as follow:
 General Manager—who would be the chairman or the energy executive and would ensure commitment from the top.
 Energy Manager—a senior manager who would manage and co-ordinate energy use on the site, advise on policy, formulate strategy and implement programs.
 Production Manager—involvement and commitment from the users are important.
 Management Accountant—the M&T system should be integrated with the standard company accounting procedures.
 Services Superintendent—person responsible for supplying the sites energy services.
 Maintenance Manager—maintenance plays a key part in keeping plant operating to its optimum efficiency levels.

Data Collection: The essential steps in setting up a data collection system would be:
 Collect Energy and Production Data: The production data should have a direct relationship with the energy consumed and in the case of space heating or air conditioning should be related to heating or cooling degree days respectively.
 Prepare log sheets: The log sheets should be kept simple, it is only a means of transferring meter readings and production data into the computer.
 Identify Staff Responsible: A person within such an EAC should be given the task of reading the meters. This can be easily accomplished as part of the employees' existing job description. Training should be given where appropriate. Production departments should supply this appropriate data.

Determining Standards: There are obvious ways in which the data can be interpreted but ultimately there will always be a relationship between the specific variables. The type of standard equation suitable for an EAC will depend on the number of specific variables and the form of relationship between energy and these specific variables.

Type 1: E=a
 Energy consumption E is constant a and there are no specific variables for the EAC. In some cases the energy consumption of an EAC may initially appear to be constant, but after the introduction M&T and improved control, a dependence on a variable may become apparent. A standard of this type may also be set when a very limited range of data is available for an EAC possibly due to an almost constant level of production.

Obviously, the standard in this case is the average energy consumption (per day, week, etc.) calculated from the historical data available.

Type 2: E=a+bP

Energy consumption is dependent on one specific variable (P) and the relationship is that of a simple straight line. For this type of equation the constant, a, is the energy consumption that occurs when the value of the specific variable is zero and is called the intercept. The constant, b, is the increase in energy for each unit increase in the value of the specific variable and is called the slope of the line.

This type of standard equation may occur for a wide range of EACs, for example a simple process area where P is production throughput or a space heating area where P is degree days.

The standard equation is derived by statistical analysis of the historical data using the least squares fit method. Manual calculation is not recommended and access to a suitable programmable calculator or microcomputer should always be sought.

Setting Targets: Two principle methods of target setting are available. They are:

(a) Based on Previous Performance: When analyzing data to a set standard equation a degree of scatter is normally expected. In other words a range of performance has occurred. It can be argued that it ought to be possible to repeat the best levels of performance observed. In this way a target can be set at a level which has already been achieved on location and is therefore realistic.

If a standard line has been drawn through a set of data, the points below the line can be identified as those with the best performance. A new line of the same type can be drawn through these points to become the target line. This can be performed automatically using computer software. Ideally the target line should be based on 10 to 20 data points. When a computer is being used for the analysis, this method offers a simple means of setting realistic targets.

(b) Simple Percentage Reductions: Using this method a target can be set simply by aiming at say a 5% reduction in energy use relative to the standard calculation, this could be appropriate where the target produced by the previous method was found to be unsuitable.

Reporting: The report should contain the values of the energies consumed, variables, specific energy ratios of actual, standard and target, percentage energy cost and cost variance from standard as well as target.

Conclusion: Monitoring and targeting has proved to be a very cost effective way of reducing energy costs and more importantly sustaining the initial savings made. Computerising the M&T process will speed up and simplify the whole process of this management information system.

Another paper titled "A Microcomputer-based Energy Monitoring Program for Industry (EMOPIN)" by Z. Z. Yu, S. N. Tay and W.G. Cartwright Computers in Industry 13 (1989) 155–167 introduces a microcomputer-based energy monitoring program for industry (EMOPIN). The essential information of energy consumption in industrial plants is discussed and analyzed. For running the program, the energy consumption data, the production output data, and other relevant information are to be fed manually into a database. The program processes this information into useful and meaningful indicators such as Specific Energy Consumptions (SECs) and Energy Cost Factors (ECFs) and provides reports to the plant's energy managers or engineers. Where appropriate, suggestions are provided to assist in the identification of the source of any energy consumption abnormality.

In this paper, a special treatment have been given for deriving the Specific Energy Consumption and the gist is as given below.

Energy consumption should not be expected to be directly proportional to production output and some special indicators for energy management should be introduced to provide useful and meaningful information. Specific energy consumption (SEC) is selected as one of the indicators. It is normally defined as the energy consumption per unit production output. As a general rule, the value of SEC reduces as the rate of production increases due to the effect of economies of scale.

In manufacturing industries, it is often found that a variety of products of a similar nature are produced, and at the same time various types of energy are consumed in the production processes. The measurable quantities are (a) the consumption of each energy type over a period and (b) the output of each product type over the same period. In the simplest case, the different products may be produced totally independent of each other. Alternatively, they may share the same production facilities with other products. In a fully automated production process, it may be possible to meter the separate energy inputs to each product regardless of whether they use shared equipment or not and then to obtain SEC for each product under each energy item. In practice, it may be difficult, or even impossible to obtain such detailed information on different energy inputs to each product. Two methods are introduced to solve this problem.

The first method is to convert the output of each product into the equivalent output of a standard product and then get the specific energy consumption under each particular energy item (SEC). The governing equation of the first method is as shown below:

$$SEC = \frac{\text{(Consumption of a particular energy item)}}{\text{(Total equivalent production output)}}$$

The numerator of the equation is the consumption of a single energy type, such as electricity, in the production processes which can be obtained from main meters. The denominator of the equation is equal to the sum of the actual output of each product times its equivalent factor (EF). One product will be selected as the standard product having an equivalent factor of 1.0. This may be the product which normally has the greatest output. The equivalent factor of all other products may then be determined on the basis of their value relative to the standard product. In this report, however, the equivalent factor is determined on the basis of the energy input to a product in relation to the energy input to the standard product.

The second method is to convert the consumption value of each energy item into an equivalent energy value and get the specific energy consumption for a particular product (SEC_1). The specific energy consumption for a particular product (SEC_1) is defined as:

$$SEC\_1 = \frac{\text{(Total equivalent energy consumption)}}{\text{(output of a particular product)}}$$

The numerator is the sum of each fuel type used for a particular product, each multiplied by an equivalent energy content factor. This factor represents the total energy of a fuel. The equivalent energy content factors of common industrial energy items are well known. This permits the exact definition of equivalent factor of different products on an energy input basis.

The equivalent factor (EF), can then be defined as:

$$EF = \frac{\text{(SEC\_1 of the particular product)}}{\text{(SEC\_1 of the standard product)}}$$

In theory, the second method is better than the first method. But in practice, the first method is more acceptable and practicable in manufacturing plants.

EMOPIN program has been demonstrated to process three months daily data of a beverage manufacturing plant in Singapore. The company manufactures six different type of products, viz., BOTTLE, CAN, PET, HANDY, CONC AND JUICE. The types of energy sources used are electricity, fuel and water. The daily input raw data are processed into useful information such as daily SEC, daily ECF, and their deviations from the standard SEC and ECF, etc.

This daily report gives the details of product and energy separately. In the product information, it gives the quantities of each type of product along with value, net output and equivalent factor. The net consumptions of all types of energies are given in the energy information along with cost incurred on each type of energy, actual specific energy consumption, standard specific energy consumption and the percentage deviation. At the end of report, some useful hints are generated by the program to draw immediate attention of the management for corrective actions. A typical example of the report generated by this system is shown in FIG. 10.

Enercon Systems, Pvt. Ltd. Bangalore, India is one of the pioneers in manufacturing digital energy meters and energy management software products. The company designs, manufactures and markets a wide range of Digital panel meters, electronic energy meters and multi-function load managers.

The company is supplying eLAN Energy Management Networks which consist of Enercon electronic energy meters or multi-function meters connected to PC on MODBUS. The block diagram of the eLAN Energy Management Networks is shown in FIG. 8. An eLAN SCADA software runs on a PC and supports all standard features required for an Electrical Energy Management System. It generates different types of energy information reports with pre-configured screens of mimics, trends, history, alarms etc.

Figure 9:
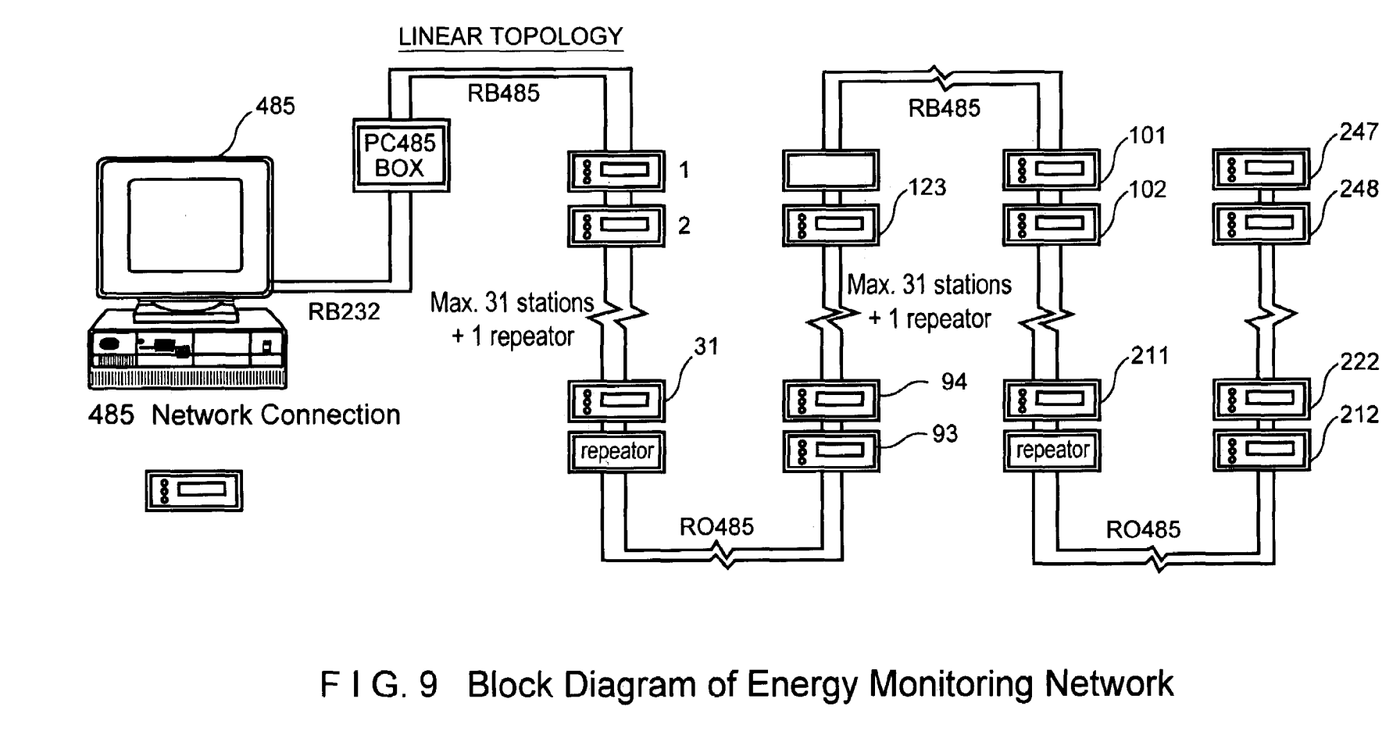
FIG. 9 represents the block diagram of Energy Monitoring Network.

Alacrity Electronics Limited, Chennai, India is supplying KRYKARD PC based Energy Monitoring network, which uses its microprocessor based panel meters and AlEnSoft software for industrial on-line electrical information for effective analysis and reporting. The block diagram is shown in FIG. 9. Alabar Associates, England is manufacturing Albar Windows Energy Monitoring System. It consists of multiple data loggers connected to PC over RS-485 communication interface. The system can be used to monitor and record electricity, gas, steam and other meters. It can take care of cost centers within sites and even for widespread sites. Receives information in the form of pulses and is optimized for meter data services market.

Drawbacks and Difficulties in the Existing Known Art

The methodology for industrial energy management has been thoroughly worked out in the above referred existing literature. Even some companies are trying to implement this methodology and supplying the systems. However these systems are not very appropriate for comprehensive industrial energy management. They give only partial solutions.

Most of the companies are supplying energy monitoring systems as an extension of their metering product range. The solution involves some difficulties like introducing these meters into the control panels which warrants additional work for installation. As the systems are extensions of metering products, the cost is not optimized. System flexibility is needed to optimize the cost.

Requirements of Removing the Drawbacks

At present, there are many industrial electrical distribution systems where a single utility meter is provided at an electrical service entrance exclusively for electrical tariff payment purposes. With this arrangement, individual energy consumptions in different utilities and production units in an industry cannot be individually monitored and cost allocated. This tends to promote waste as the information on what energy consumption should be and what it is not available preempting all efforts for energy conservation. Similar is the case for steam flow to different sections of the industry.

It is well known now that Energy Monitoring System is a basic tool for industrial energy management. Different types of measurements are needed for energy management, like temperature, pressure, flow, time etc. Energy Monitoring systems should have the flexibility to monitor these parameters along with electrical energy. Cost is one of the impediments for the proliferation of industrial energy monitoring systems. To keep the cost at moderate level, sometimes indirect measurements are helpful. For example, it is possible to derive the energy consumption of a constant load by noting its time of operation.

At present industries are evaluating the energy monitoring systems in terms of financial benefits and payback periods. Hence relevant energy studies are necessary for optimum configuration of energy monitoring systems. Hence industrial energy monitoring should be seen more as an evolving of solution which involves energy studies, system configuration, system development, system integration, commissioning, installation and training.

Due to the absence of a system to determine the above information there is quire a lot of wastage of valuable energy resulting in many problems such as higher production cost, environmental pollution due to higher energy consumption etc.

Objects of the present Invention:

The main objective of the present invention is to provide a computer controlled on-line Energy Monitoring System which is relatively simple, reliable and utilizes low-cost data communication system for conservation and good management of energy.

Another objective of the present invention is to provide a computer controlled on-line Energy Monitoring System which is flexible and versatile, and which can be easily adapted to accurately take various measurements from industrial electrical consuming equipment and standard industrial transmitters which may be connected to different channels of the remote data acquisition systems.

Still another objective of the present invention is to provide a computer controlled on-line Energy Monitoring System by which the industry personnel can work out the schedule of maintenance of the equipments by using the data generated by the system. Yet an additional objective of the present invention is to provide a centralized energy monitoring system which facilitates energy monitoring of measurements connected with electrical energy as well as thermal energy.

One more objective of the present invention is to provide a system which will indicate the changes in the pattern of daily energy consumption of a particular machinery using which prompt and appropriate maintenance decisions for optimizing the operational and maintenance costs can be initiated.

One another objective of the present invention is to provide a low cost energy monitoring and accounting system which takes care of both electrical and thermal energies.

Still another objective of the present invention is to provide a data acquisition system useful for incorporation in the energy monitoring of the present invention

BRIEF DESCRIPTION OF THE ACCOMPANYING DRAWINGS

In the drawings accompanying the specification,

FIG. 4 is the overall system flowchart for the operation software of the Computer Controlled on-line Energy Monitoring system illustrated in FIG. 1.

FIGS. 7A and 7B, together constitute the reports generated by the Computer Controlled on-line Energy Monitoring System of the invention for daily production meetings in an industry.

FIG. 8 represents the block diagram of the eLAN Energy Management Network.

FIG. 10 represents the report obtained from the Energy Monitoring Program for Industry (EMPOIN).

SUMMARY OF THE PRESENT INVENTION

Accordingly the present invention provides a low cost energy monitoring and accounting system for conservation and management of both electrical and mechanical energy. The energy balance established by the energy monitoring system clearly brings out the losses and wastes as well as abnormalities in energy consumption at different sections of the industry paving the way for effective energy management.

DETAILED DESCRIPTION OF THE PRESENT INVENTION

Figure 2:
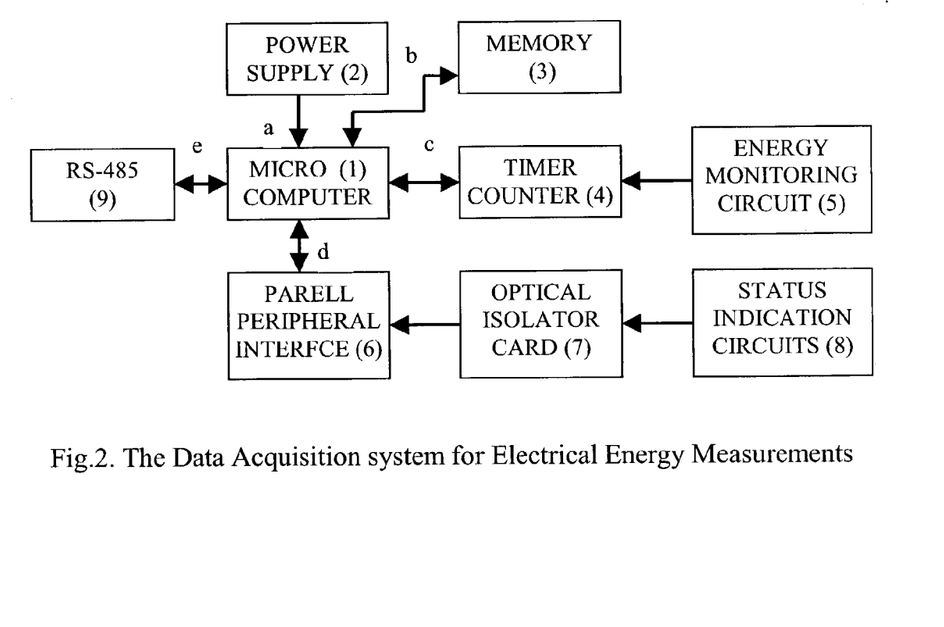
FIG. 2 is the block diagram of the data acquisition system incorporated in Computer Controlled on-line Energy Monitoring system for electrical energy measurements.

The present invention provides a data acquisition system for incorporation into a computer controlled on-line Energy Monitoring System for monitoring electrical energy consumed, said data acquisition system comprises of:
  a) a micro computer (1) having a plurality of ports (a), (b), (c), (d) and (e);
  b) port (a) being connected to a means (2) for converting AC current into DC current, said means (2) being provided with a terminal for connecting to a AC power source;
  c) port (b) being coupled to a memory device (3), and configured to store data on the memory device and retrieve the stored data;
  d) port (c) being coupled to a balanced electrical load through a timer/counter circuit (4) and an Energy Monitoring Circuit (5) for monitoring the electrical energy consumed by the balanced load;
  e) port (d) being coupled to a status indication circuit (8) through a parallel peripheral interface (6) and an optical isolator card (7) and configured to receive the ON/OFF status after regular intervals of time, and
  f) port (e) being coupled to a RS 485 converter circuit (9) for transmitting data acquired and receiving control data.

In an embodiment of the present invention, the timer/counter circuit is configured to count output pulses from the Energy Monitoring Circuit (5).

In another embodiment of the present invention, the optical isolator is an AC/DC to TTL optical isolator.

Figure 3:
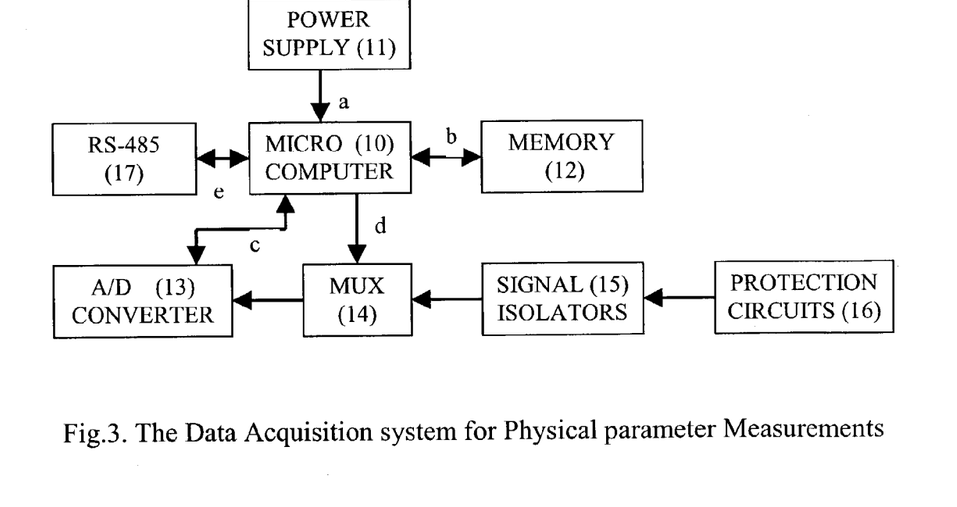
FIG. 3 is the block diagram of the data acquisition system incorporated in Computer Controlled on-line Energy Monitoring system for physical parameter measurements.

The present invention also provides a data acquisition system for incorporation into a computer controlled on-line Energy Monitoring System for monitoring physical parameters, the said data acquisition system comprises of:
  a) a micro computer (1) having a plurality of ports (a), (b), (c), (d) and (e);
  b) port (a) being connected to a means (2) for converting AC current into DC current, said means (2) being provided with a terminal for connecting to a AC power source;
  c) port (b) being coupled to a memory device (3), and configured to store data on the memory device and retrieve the stored data;
  d) port (c) being coupled to an output of a A/D converter (13) and input of said A/D converter being connected to an output of a multiplexer (14), said multiplexer being connected at its input to one or more physical parameter sensing means through a signal isolator (15) and a protection circuit (16);
  e) port (d) being connected to the multiplexer (14) for controlling its output, and
  f) port (e) being coupled to a RS 485 converter circuit (17) for transmitting data acquired and receiving control data.

Figure 1:
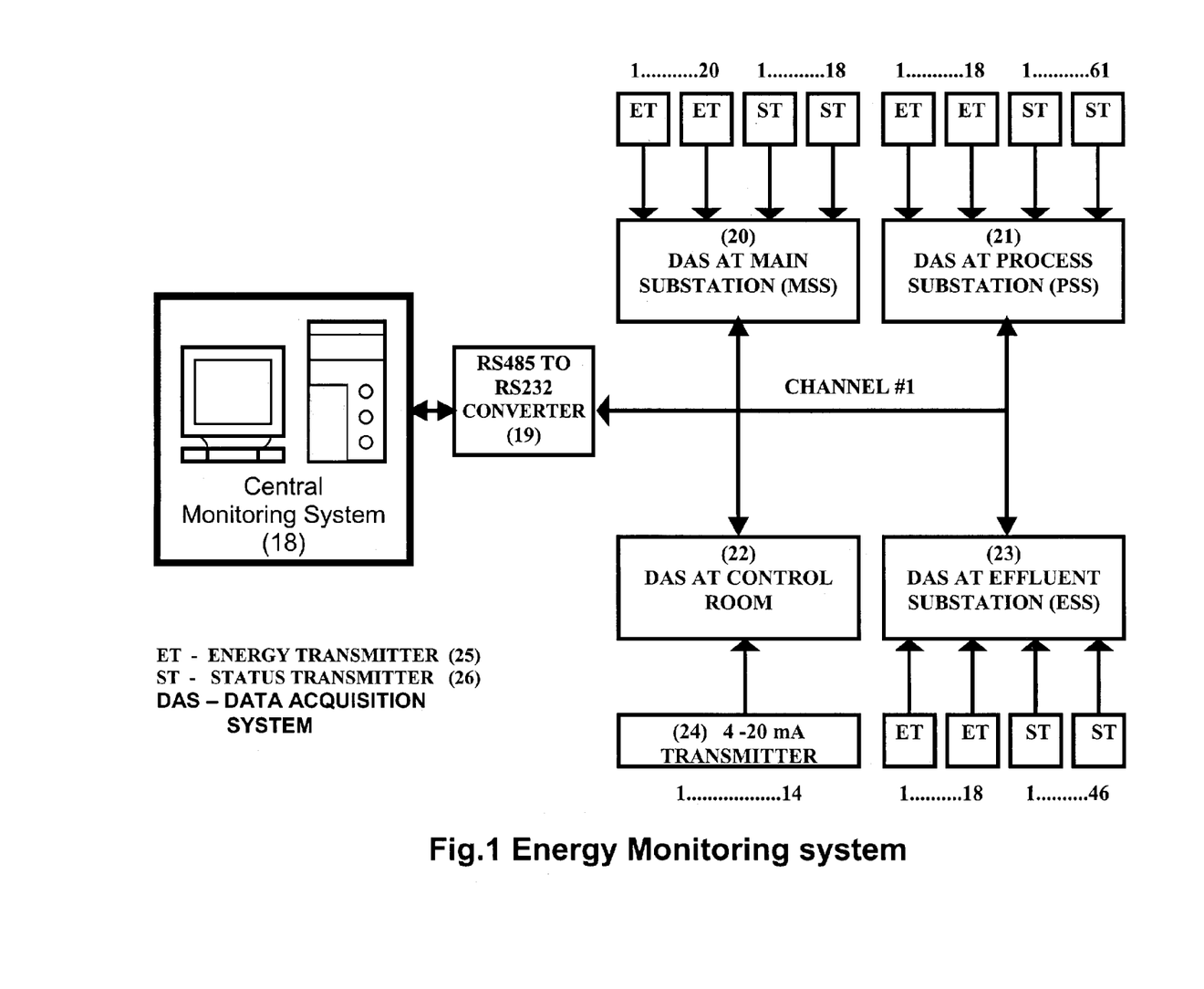
FIG. 1 is the block diagram of the Computer Controlled on-line Energy Monitoring System of the present invention.

The present invention further provides a computer controlled on-line Energy Monitoring System useful for monitoring electrical energy consumed and/or physical parameters in an industry, said Energy Monitoring System comprises of a Central Monitoring System (18) consisting of a PC, said Central Monitoring System being connected to a plurality of Data acquisition system configured to monitor electrical energy consumed and/or physical parameters through a common communication channel.

In an embodiment of the present invention, the Data Acquisition System is a combination of Data Acquisition System for monitoring Energy and Data Acquisition System for monitoring physical parameters.

In another embodiment of the present invention, 32 Data Acquisition Systems are connected to the Central Monitoring System.

In yet another embodiment of the present invention, the common communication channel is RS 485 cable.

In still another embodiment of the present invention, the Data Acquisition Systems and Central Monitoring System are connected to the RS 485 cable through an RS 485 to RS 232 converter.

It is to be kept in mind that as the complexity of the system varies with the size and requirements of the industry, the configuration had to be tailor made to meet the requirements. Accordingly the invention also envisages within its scope the legitimate modification falling within the constructional features explained above.

The complete system is based around PC, Data Acquisition Systems based around six electronic modules, standard communication protocols and software menus. The system is basically a Hierarchical Distributed Data Acquisition System for Energy Management.

The block diagram of the Computer Controlled on-line Energy Monitoring System of the present invention as shown in FIG. 1 monitors the energy consumptions and production outputs in various plants for the manufacture of Propylene Oxide, Propylene Glycol, Polyols, Milk of Lime and utilities like, Air conditioning & Refrigeration, Effluent Treatment Plant etc. As all the loads are balanced, only single-phase measurements were taken and three-phase energy consumption was calculated in the software. For constant loads, only status (on/off time) of the equipment was monitored and based on the running time, energy consumption was calculated, based on manual entry of uniform power consumption value. 195 on-line measurement points were identified and connected to this system.

The energy monitoring points are monitored in three Data Acquisition Systems (DAS). The product outputs and steam flow and temperature at various points are monitored using the Data Acquisition system at control room. The Data Acquisition Systems have been placed at Main Substation, Process Substation, Effluent Substation and Control Room of the factory. The Data Acquisition systems were connected to the Personal Computer using RS-485 communication techniques. The data acquisition systems used here are of two types; one is for energy monitoring and the other one is for physical parameters monitoring such as flow, temperature, pressure etc. The points monitored were classified into three groups—Single phase real energy monitoring; ON/OFF Status monitoring of the equipment and Physical parameter monitoring from the parameter.

As an optional feature, the system gives the running hours of the machinery. This information is useful for working out the maintenance schedule of the machinery with little or no disturbance to the production.

The present invention is the realization energy management tool through on-line and real time computer based energy monitoring system. The present invention uses the computer not only for the analysis but also for collecting the information on-line. The present invention is for effective management of electrical energy as well as thermal energy in an industry. Further, data acquisition systems also contain the electrical energy monitoring circuits eliminating the need for fixing the meters externally in the control panels. The present invention is optimized for industrial energy management comprehensively.

The Data Acquisition System for electrical energy measurements as shown in FIG. 2 can monitor either the real electrical energy consumptions or on/off status indications of the equipment.

It Consists of Microcomputer card, Timer/Counter Cards, Memory card for data storage and firmware, Peripheral Interface Card, Optical Isolator Card, Energy Monitoring Circuits cards, Machine oh-off status indication circuits card and Power supply unit interconnected as shown in FIG. 2 and explained above.

The pulses from the Energy Monitoring circuits are counted by the CPU card through Timer/Counters and stored in the memory. ON/OFF status from the machine status indication circuits is monitored through Peripheral Interface Card and stored in memory at an interval of one minute. The firmware is capable of formatting the data stored in memory to communicate using RS 485. DAS identification can be set by DIP switch selection provided in the hardware. The energy data of the connected loads can be stored in the memory for every 15 minutes time. It has the capability to store one day information. The firmware of the system includes settings for communications on RS 485 (send & wait Protocol). This system can be connected to any host such as PC or supervisory controller.

The Data Acquisition System of the present invention for Physical parameter measurements is shown in FIG. 3 can monitor the real world signals in the form of 4–20 mA signals. The system can measure physical parameters such as oil flow, gas flow, steam flow, temperature, compressed air flow, product output etc.

The Data Acquisition System for Physical parameter measurement consists of Microcomputer board, Memory card, Analog to Digital Converter, Multiplexer, Signal Isolators, Input protection circuits and Power Supply interconnected as shown in FIG. 3. The transmitters capture the physical data such as Steam Temperature, Steam Flow and Production outputs and generates a proportional electrical signal in the form of 4–20 mA. These signals are connected via protecting circuits to the signal isolators to the DAS. The output of the signal Isolators are connected to the differential ended multiplexer and Analog to Digital Converter. The Digital output from the A/D is given to the Microcomputer circuit. The Microcomputer stores the data in its on-board memory at an interval of one minute. The firmware is capable of formatting the data stored in memory to communicate using RS 485. DAS identification can be set by DIP switch selection provided in the hardware. The data of the connected parameters are stored in the memory for every 15 minute time. It has the capability to store one day information. The firmware for the system includes setting for communications on RS-485.

Principle by which the Invention is Developed

The present invention has been developed on the basis that a centralized energy monitoring system provided with a plurality of data acquisition systems communicate with a central monitoring system over a plurality of communication channels each of which are shared by one or more data acquisition systems. According to the system, data communicated from the remote data acquisition system to the central monitoring system is representative of either the energy consumed by an industrial electrical equipment or on-time duration of an industrial electrical equipment, temperature or flow of a process fluid, flow of product output by the central monitoring system to provide the energy consumptions and specific energy consumptions of different utility sections and production units in an industry.

Software Description

The EMS concurrently performs two tasks independently as shown in flow chart FIG. 4 (i) Data collection and storing (ii) User interface for system operation.

Data Collection and Storing (FIG. 4)

Step 112: The Serial Port may be preconfigured or user defined. The features like using of either serial port1 (Comm1) or serial Port2 (Comm2) or both are defined. The Data Acquisition Systems (ID) that are connected to Comm1 and/or Comm2 are defined. Other general serial communication settings like Baud Rate, Data Bits, Parity and Stop Bit are also defined.

Step 113: Send packet 1 with date and time stamp and checksum to the Data Acquisition Systems.

Step 114: If acknowledgement is received for packet 1, from the DAS whose ID matches with the DAS ID of packet1. Check for number of transactions.

Step 115: When the number of transactions are not equal to zero send request asking for the transmission of data from the DAS.

Step 116: Receive the transmitted data from DAS, check for the reliability of data by calculating checksum. Compare the calculated checksum with the received checksum and send acknowledgement if they match.

Step 117: Calculate the electrical energy consumptions for each of the continuous electrical transmitters from the number of pulse received.

(No. of pulses*calibration constant*CT ratio*3)/1000=kwh Calculate the electrical energy consumption for each ON/OFF transmitters (Equipment run time in sec*V*I*PF*3)/3600*1000=kwh Convert physical parameter digital output into engineering units.

(Digital output data/4095)/full scale range

Step 118: Store the calculated information at intervals selected by the user into the MS Access Database.

User Interface System Operation (FIG. 4)

Step 100: The Main Window of the GUI software with the menu items is displayed for user selection.

Step 101: Enables the user to configure the details of the equipments connected to the Data Acquisition Systems.

Step 102: Electrical related parameters of the equipment like channel no, DAS no, transmitter no, equipment name, panel no, plant name, monitoring type, rated capacity, CT ratio/constant low current with remarks is preconfigured or user defined.

Thermal related parameters like channel no, DAS no, transmitter no, parameter, tag no, linear/nonlinear, range, units and remarks are predefined or user defined.

The rate of collection of data from DAS from minimum of 1 minute to maximum of 60 minutes may be defined.

OFF line production/batch details may be entered on daily basis.

Facility to enter unmonitored energy consumption details as one time entry.

Step 103: Facility for the administrators to authenticate certain features of the software to his subordinates.

Step 104: Provision to change the password by the administrator.

Step 105: To generate different types of tabular reports.

Step 106: To generate the following reports

Plant shift report:—Provision of user controls for selection plant name, date and shift No. Based on the selection, the data is processed and the energy consumption calculated and the result may be output to the screen or the printer.

Plant Daily report:—Provision of user controls for selection plant name and date. Based on the selection, the data is processed and the energy consumption calculated and the result may be output to the screen or the printer.

DAS shift report:—Provision of user controls for selection DAS name, date and shift No. Based on the selection, the data is processed and the energy consumption calculated and the result may be output to the screen or the printer.

DAS Daily report:—Provision of user controls for selection DAS name and date. Based on the selection, the data is processed and the energy consumption calculated and the result may be output to the screen or the printer.

Daily Normal report:—Provision of user controls for selection of date. Based on the selection, the data is processed and the energy consumption, production output, specific energy consumption and specific steam consumption are calculated and the result may be output to the screen or the printer.

Comparison Report:—Provision of user controls for selection of date. Based on the selection, the data of the selected date and the previous date are processed and the energy consumption of the high capacity machines are listed for comparison.

Weekly report:—Provision of calendar control to enable selection of year, month and start date of report. The data for 7 days from the start date are processed and weekly energy consumption calculated and output to screen/printer.

Monthly report—Provision for selection year and month for the report. The data is processed and energy consumptions of high capacity machines calculated and reported.

Step 107: To generate trend and bar graphs

Step 108: Trend graph of electrical equipments:—Provision of user controls for selection of date, maximum of 6 equipments from the list of equipments, to plot the trend graph of the energy consumption patterns.

Bar chart:—Provision to select the date, to plot the bar graph of the energy consumptions of the various plants for the day.

Step 109:—To maintain the database size, and to identify the problems.

Step 110:—To view the data in the database and to delete data by authorized persons.

Figure 5:
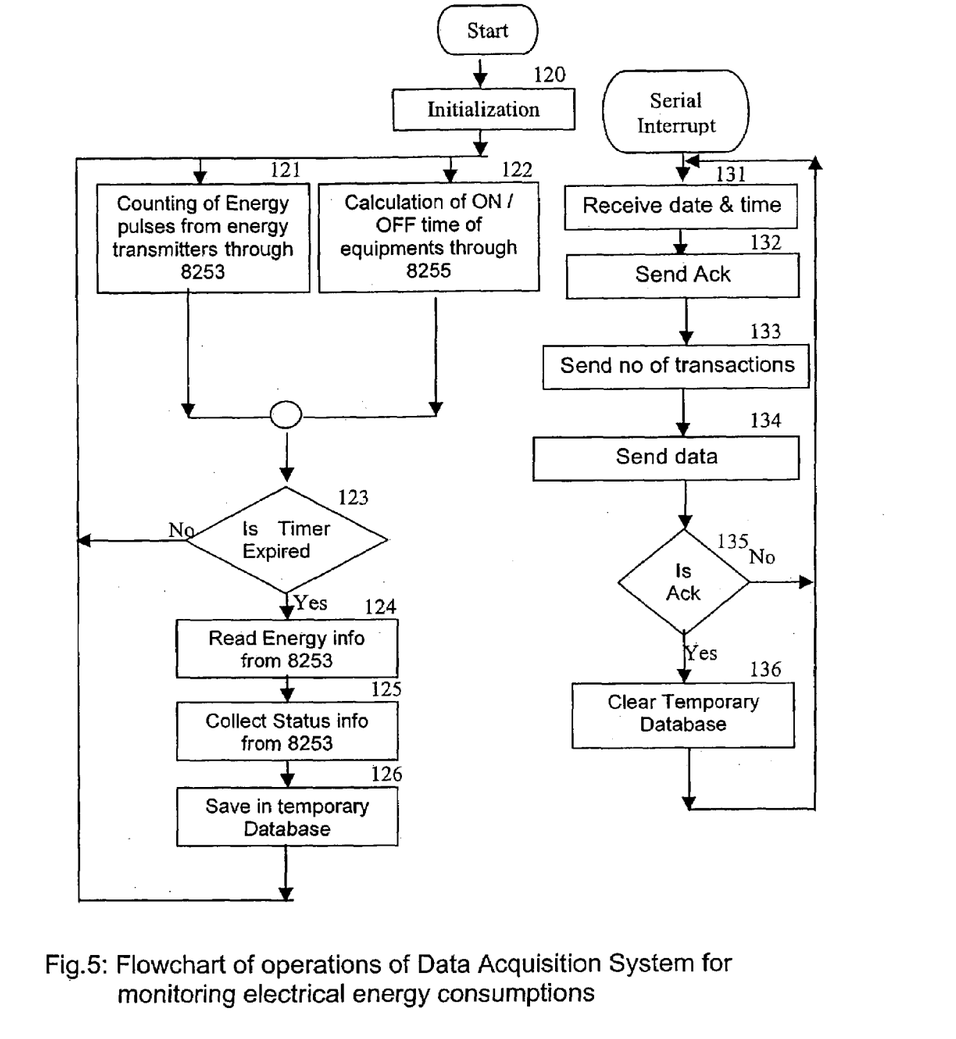
FIG. 5 is the flowchart for the operation software of the data acquisition system shown in FIG. 2 connected with electrical measurements.

DAS for Electrical Energy as shown in FIG. 5:

Step 120: Initialization of 8031 micro controller, 8253 timer counter, 8255 I/O device, and variables.

Step 121: Independent counters keep accumulating the energy pulses.

Step 122: The processor checks for the I/O port values for every one second, if it is ON state then increment a counter similarly check other I/O ports and store value in independent variables.

Step 123: Check timer expires.

Step 124: the processor reads energy information from the counter and accumulates.

Step 125: Accumulate ON seconds.

Step 126: Save each equipment pulses and each equipment ON seconds along with transmitter ID, shift time and date in a temporary database.

Serial Interrupt

Format of the Packet:

Header1, Header2, DAS ID, Command, Length of data, IFLAG, Stx, Data, Checksum.

Step 131: Receive date and time stamp from the PC along with checksum.

Step 132: Calculate the checksum compare with received checksum. The DAS whose ID matches with DAS ID responds to the packet, by sending an acknowledgement.

Step 133: If the transactions are available send the number of transactions else send zero as number of transactions.

Step 134: On request from the PC for the data transmission send the data.

Step 135: Check if Ack is received conforming the reliable data transmission.

Step 136: The data is deleted from the temporary database.

Figure 6:
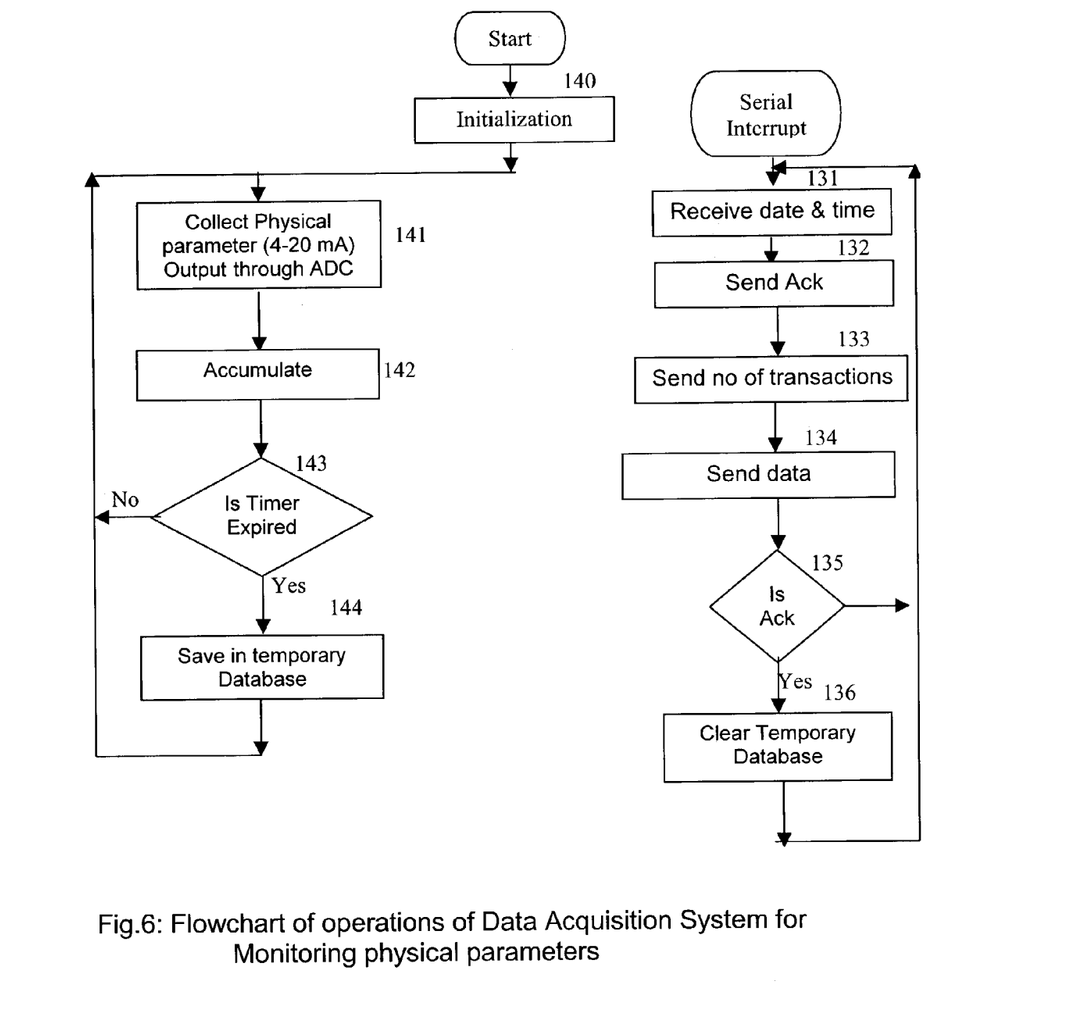
FIG. 6 is the flowchart for the operation software of the remote data acquisition system shown in FIG. 3 connected with physical parameter measurements.

DAS for Physical Parameters as Shown in FIG. 6:

Step 140: Initialization of 8031 micro controller, A/D converter and variables.

Step 141: Digitise analog values of each parameter. The processor reads digitized physical parameter values for every one minute.

Step 142: Accumulates digitized physical parameters values in independent temporary locations.

Step 143: Check if timer expires.

Step 144: Save each physical parameter values in temporary database along with physical parameter number & shift time.

The advantages of the Computer controlled on-line Energy Monitoring System of the present invention is illustrated by the Experiments conducted using the Energy Monitoring System in M/s Manali Petrochemicals Ltd. The results are provided the FIGS. 7(a) and 7(b).

Figure 7A:
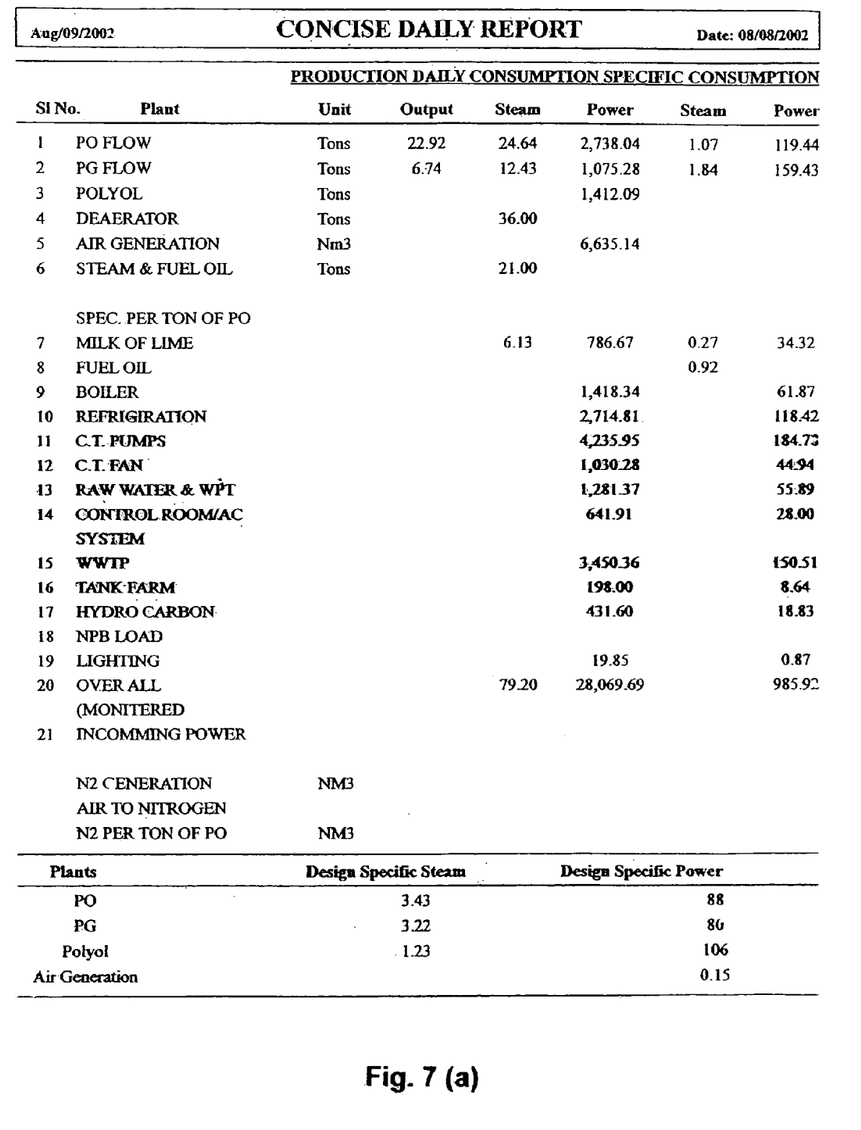

Concise Daily Report—FIG. 7(a):

Concise Daily Report gives the production output, total steam & power consumptions, specific steam and specific energy consumption for the products Propylene Oxide (PO), Propylene Glycol (PG) and Polyol in Tons. It also gives the steam, power, specific steam and specific energy consumptions of various plants in the industry. It also gives energy balance information such as total incoming power, total power consumed by the industry. It also gives the details of fuel consumption for the steam generation, total air generation and nitrogen generation details based on the day-to-day information fed by the user.

The norms of the industry for all three products are given in the footer of the report to enable easy comparison of real consumptions versus standard consumptions that enables the managerial personal to apply necessary actions to maintain the norms.

Comparison Report—FIG. 7(b):

This report gives information about the power consumption of the Propylene Oxide (PO) plant, Propylene Glycol (PG) plant and Polyol plant with the production status of the plants with batch details of the desired day in comparison with the previous day. It also gives the details of the rated capacities of the energy intensive equipments, their power consumptions for both the days with performance difference.

The comparison report is helpful to the management to find any abnormality in the day to day energy consumptions.

It helps to pin point the abnormal energy consuming equipments. So that the management to take corrective measures.

The utility of the Energy Monitoring System has been thoroughly established in M/s Manali Petrochemicals Ltd., Chennai.

Before the installation of Energy Monitoring System, a single Energy meter showing the total energy consumption of the plant is the only measurement available. After Energy Monitoring System installation, the industry is empowered with the following energy data.

Energy consumption of each equipment
    Running hours of each equipment
    Starting and stopping time of each equipment
    Electrical energy consumptions at each plant and utility
    Steam consumption at each plant and utility
    Daily specific Electrical Energy Consumptions
    Daily Specific Steam Energy Consumptions
    Substation level reports
    Shift reports
    Comprehensive Daily report
    Precise daily reports The Energy Monitoring System has been used in several ways as given below.

General Utilization:
    To identify the low efficiency/high power consumers
    To identify over loaded/under loaded motors
    To identify faulty equipment Utilization for Maintenance:
    To prepare the preventive maintenance schedule with equipment running hours data Utility of continuous monitoring:
    Analysis of power consumption data over day and night, specially refrigeration system.
    Study of the variation of Energy consumption vs. Production.
    Study of the idle running/redundant running of the machinery.
    Study of the energy consumption per batch.
    Study of the time cycles for batch operations.
    Exact timings of plant start and stop operations.
    Analysis of energy consumptions before and after the changes of machinery including the kick starts.
    Capacity enhancement studies for suitable motor selection Advantages of the Invention The energy monitoring system provides a low cost energy monitoring and accounting system taking care of both electrical and thermal energies.

The energy balance established by the energy monitoring system clearly brings out the losses and wastes as well as abnormalities in energy consumptions at different sections of the industry paving the way for effective energy management.

The energy monitoring system is flexible and versatile, and which can be easily adapted to accurately take various measurements from industrial electrical consuming equipment and standard industrial transmitters which may be connected to different channels of the remote data acquisition systems. Thus the energy monitoring takes care of measurements connected with electrical energy as well as thermal energy.

The cost of the Energy Monitoring System is optimized by selectively introducing three phase electrical energy measurements for unbalanced loads and single phase electrical energy measurements for the balanced loads. Further, if the power consumption of the equipment is uniform, the energy measurement is derived from the on-time measurement of the load with additional one-time manual entries.

The EMS also allows industry personnel to work out the maintenance of equipment by using the time of use data generated by Energy Monitoring System. In some instances, by observing the changes in the pattern of daily energy consumptions of a particular machinery recorded by the Energy Monitoring System, the maintenance engineers can take prompt and appropriate maintenance decisions optimizing the operational and maintenance costs.

The invention claimed is:

1. A computer controlled on-line Monitoring System for monitoring at least one of electrical energy consumed and at least one physical parameter, said Monitoring System comprising a central monitoring system (18) having a PC and being connected to at least one data acquisition system (20, 21, 22, 23, . . . ) configured to monitor the at least one of electrical energy consumed and physical parameter through a common communication channel, wherein the data acquisition system monitors the electrical energy consumed and comprises:

a micro computer (1) having a plurality of ports (a), (b), (c), (d) and (e);

port (a) being connected to a means (2) for converting AC current into DC current, said means (2) being provided with a terminal for connecting to a AC power source;

port (b) being coupled to a memory device (3), and configured to store data on the memory device and retrieve the stored data;

port (c) being coupled to a balanced electrical load through a timer/counter circuit (4) and an Energy Monitoring Circuit (5) for monitoring the electrical energy consumed by the balanced load;

port (d) being coupled to a status indication circuit (8) through a parallel peripheral interface (6) and an optical isolator card (7) and configured to receive the ON/OFF status after regular intervals of time; and port (e) being coupled to a RS 485 converter circuit (9) for transmitting data acquired and receiving control data.

2. A computer controlled on-line Monitoring System as claimed in claim 1, wherein the common communication channel is RS 485 cable.

3. A computer controlled on-line Monitoring System as claimed in claim 2, wherein the data acquisition system and central monitoring system are connected to RS 485 cable through a RS 485 to RS 232 converter.

4. A computer controlled on-line Energy Monitoring System as claimed in claim 1, wherein the timer/counter circuit is configured to count output pulses from the Energy Monitoring Circuit (5).

5. In a computer controlled on-line Monitoring System for monitoring at least one of electrical energy and a physical parameters comprising one or more of oil flow, gas flow, steam flow, temperature, compressed air flow and product output, the improvements of said Monitoring System comprising:

a Central Monitoring System having a micro computer (1) having a plurality of ports (a), (b), (c), (d) and (e);

port (a) being connected to a means (2) for converting AC current into DC current, said means (2) being provided with a terminal for connecting to a AC power source;

port (b) being coupled to a memory device (3), and configured to store data on the memory device and retrieve the stored data;

port (c) being coupled to a balanced electrical load through a timer/counter (4) and an energy monitoring circuit (5) for monitoring electrical energy consumed by the balanced load or being coupled to an output of a A/D converter (13) and input of said A/D converter being connected to an output of a multiplexer (14), said multiplexer being connected at its input to one or more means for sensing the physical parameter through a signal isolator (15) and a protection circuit (16);

port (d) being coupled to a status indication circuit (8) through a parallel peripheral interface (6) and an optical isolator card (7) and configured to receive ON/OFF status after regular intervals of time; and port (e) being coupled to a RS 485 converter circuit (9) for transmitting data acquired and receiving control data.

* * * * *

UNITED STATES PATENT AND TRADEMARK OFFICE
CERTIFICATE OF CORRECTION

| | | |
|---|---|---|
| PATENT NO. | : 7,142,994 B2 | Page 1 of 1 |
| APPLICATION NO. | : 10/386157 | |
| DATED | : November 28, 2006 | |
| INVENTOR(S) | : Rekapalli Krishnamohan Rao et al. | |

It is certified that error appears in the above-identified patent and that said Letters Patent is hereby corrected as shown below:

On title page, item ( * ) Notice: delete "This patent is subject to a terminal disclaimer."

Signed and Sealed this

Sixth Day of February, 2007

JON W. DUDAS
*Director of the United States Patent and Trademark Office*